UNITED STATES PATENT OFFICE.

JOSEPH T. MAYBURY, OF MOBILE, ALABAMA.

PROCESS FOR CANNING OYSTERS.

SPECIFICATION forming part of Letters Patent No. 230,561, dated July 27, 1880.

Application filed June 4, 1880. (Specimens.)

*To all whom it may concern:*

Be it known that I, JOSEPH THOMAS MAYBURY, of Mobile, in the county of Mobile and State of Alabama, have invented a new and Improved Process of Canning Oysters; and I do hereby declare that the following is a full, clear, and exact description of the same.

In canning and preserving oysters found in Chesapeake Bay and other northern waters the method usually pursued is to parboil or partly cook them in the tin cans in which they are intended to be put upon the market and sold for use. This method cannot, however, be successfully employed in canning the oysters found in the Gulf of Mexico, for, owing to their greater size and less density of structure, they tend to disintegrate, so that on opening the cans after the boiling process is completed nothing but the horny "eye" or "heart" will be found intact, the remaining portion having separated into small pieces in the liquor.

In the course of many unsuccessful experiments with various antiseptics, made with a view to preserving the Gulf oyster without subjecting it to so great heat or for so long a time, I was led to the discovery of a simple and comparatively inexpensive process, whereby such oysters may be hardened, so that they may be boiled without disintegrating, and thus canned and preserved in the usual way.

The process consists in the following steps: To a quantity—say ten gallons—of pure water I add one-half gallon of good commercial vinegar and one and six-tenths gill of a saturated aqueous solution of salicylic acid, to which mixture sufficient common salt is also added to impart the requisite salty taste or flavor to the oysters. The mixture is boiled a few minutes, and then poured over the oysters in the cans, which are at once closed by soldering the tops, and placed in a steam-bath of a temperature of 200° Fahrenheit, which is gradually raised to 240° Fahrenheit, the latter degree being maintained for about forty-five minutes. The cans are then vented, again soldered or hermetically sealed, and reprocessed, or again placed in steam-bath for about thirty minutes, when they are ready to be labeled, packed, and stored or shipped.

The primary portion of the process is the chief feature of it, since the subsequent operation of cooking may be pursued under various modifications.

The quantity of acids employed is so small that they can have no effect on the taste, nor can they act as a preservative proper. They serve to coagulate the fatty portion of the oyster, and thereby harden it or render its body more dense and firm, so that it may be boiled without danger of disintegration.

I do not claim, broadly, the employment of salicylic acid for preserving food substances put up and sold in cans.

What I claim is—

The process of canning oysters which consists in placing them in cans and pouring over them a hot mixture composed of water, salicylic acid, and vinegar, in the proportions of about ten gallons, one and six-tenths gill, and one-half gallon, respectively, and then closing the cans and placing them in boiling water for a short time, substantially as described.

JOSEPH THOMAS MAYBURY.

Witnesses:
WM. S. ANDERSON,
JAMES BOND.